United States Patent
Kim

(10) Patent No.: US 11,797,112 B1
(45) Date of Patent: Oct. 24, 2023

(54) ELECTRONIC DEVICE FOR CONTROLLING HOST DEVICE BY USING MOTION SIGNAL AND MOUSE SIGNAL

(71) Applicants: COX SPACE CO., LTD, Seongnam-si (KR); Ho Yeon Kim, Suwon-si (KR)

(72) Inventor: Ho Yeon Kim, Suwon-si (KR)

(73) Assignees: COX SPACE CO., LTD., Seongnam-si (KR); Ho Yeon Kim, Suwon-si (KR)

( * ) Notice: Subject to any disclaimer, the term of this patent is extended or adjusted under 35 U.S.C. 154(b) by 0 days.

(21) Appl. No.: 18/019,832

(22) PCT Filed: May 28, 2021

(86) PCT No.: PCT/KR2021/006642
§ 371 (c)(1),
(2) Date: Feb. 6, 2023

(87) PCT Pub. No.: WO2022/035027
PCT Pub. Date: Feb. 17, 2022

(30) Foreign Application Priority Data

Aug. 11, 2020 (KR) .................. 10-2020-0100795

(51) Int. Cl.
*G06F 3/0346* (2013.01)
*G06F 3/038* (2013.01)
(Continued)

(52) U.S. Cl.
CPC .......... *G06F 3/0383* (2013.01); *G06F 3/014* (2013.01); *G06F 3/017* (2013.01); *G06F 3/0346* (2013.01);
(Continued)

(58) Field of Classification Search
CPC ........ G06F 3/0383; G06F 3/014; G06F 3/017; G06F 3/0346; G06F 3/03546;
(Continued)

(56) References Cited

U.S. PATENT DOCUMENTS

| 8,550,915 B2 * | 10/2013 | Ashida .................... A63F 13/98 |
| | | 345/161 |
| 2010/0304873 A1 * | 12/2010 | Markowitz ........... A63F 13/812 |
| | | 463/47 |

(Continued)

FOREIGN PATENT DOCUMENTS

| KR | 10-2014-0125574 A | 10/2014 |
| KR | 10-2015-0118377 A | 10/2015 |

(Continued)

OTHER PUBLICATIONS

International Search Report of PCT/KR2021/006642 dated Sep. 7, 2021.

*Primary Examiner* — Lisa S Landis
(74) *Attorney, Agent, or Firm* — Revolution IP, PLLC

(57) ABSTRACT

Disclosed is an electronic device which is paired with a host device to control content of the host device, wherein the electronic device includes a touch sensing module, a movement sensing module for acquiring first movement information of the electronic device based on an accelerometer, a gyroscope, and a magnetometer, and a control signal output unit for acquiring second movement information through operation of the first movement information, and determining, under a gesture mode, a motion corresponding to the movement of the electronic device based on the second movement information and outputting a motion signal indicating the determined motion to the host device, and determining, under a mouse mode, a mouse action based on at least one of touch information acquired from the touch sensing module and the second movement information and outputting a mouse signal indicating the mouse action.

9 Claims, 15 Drawing Sheets

(51) Int. Cl.
*G06F 3/01* (2006.01)
*G06F 3/0354* (2013.01)

(52) U.S. Cl.
CPC ...... *G06F 3/03543* (2013.01); *G06F 3/03547* (2013.01); *G06F 2203/0331* (2013.01); *G06F 2203/0335* (2013.01); *G06F 2203/0381* (2013.01); *G06F 2203/0384* (2013.01)

(58) Field of Classification Search
CPC ............ G06F 3/03543; G06F 3/03547; G06F 2203/0331; G06F 2203/0335; G06F 2203/0381; G06F 2203/0384
See application file for complete search history.

(56) References Cited

U.S. PATENT DOCUMENTS

| | | | | |
|---|---|---|---|---|
| 2011/0190056 A1* | 8/2011 | Xu | ........................ | A63F 13/235 |
| | | | | 345/169 |
| 2012/0252584 A1* | 10/2012 | Mitchell | ................. | A63F 13/98 |
| | | | | 463/47 |
| 2016/0098137 A1 | 4/2016 | Kim et al. | | |
| 2020/0258303 A1* | 8/2020 | Avrahami | ............... | G06F 3/011 |

FOREIGN PATENT DOCUMENTS

| | | |
|---|---|---|
| KR | 10-2016-0039948 A | 4/2016 |
| KR | 10-2018-0044613 A | 5/2018 |
| KR | 10-1870542 B1 | 6/2018 |
| KR | 10-2018-0112308 A | 10/2018 |
| KR | 10-2019-0040768 A | 4/2019 |

* cited by examiner

Left

Up

Right

Down

Clockwise/Counter Clockwise Rotation

Forward/Back

ELECTRONIC DEVICE FOR CONTROLLING HOST DEVICE BY USING MOTION SIGNAL AND MOUSE SIGNAL

TECHNICAL FIELD

The present invention relates to an electronic device for controlling a host device, and more particularly, to an electronic device for easily and intuitively controlling a variety of content of a host device based on a touch action or a movement in a three-dimensional space.

BACKGROUND ART

Recently, a content market based on virtual reality, such as augmented reality (AR), virtual reality (VR), and mixed reality (MR), is developing. In addition, with the popularization of virtual reality, there is a growing interest in interfaces that can create and control virtual content. Virtual content is a virtual object that is reproduced and handled in a virtual three-dimensional space, and interface devices to date have been insufficient to meet the needs of consumers and are not suitable as general-purpose interfaces.

In the case of a typical VR controller, not only the device is large, heavy, and expensive, but also learning various functions of the device is required. In addition, since the VR controller is used exclusively for a specific head mount display (HMD), there is a problem in that it is not possible to use the controller anytime and anywhere like a general general-purpose mouse.

DISCLOSURE OF THE INVENTION

Technical Problem

In the case of a typical VR controller, not only the device is large, heavy, and expensive, but also learning various functions of the device is required. In addition, since the VR controller is used exclusively for a specific head mount display (HMD), there is a problem in that it is not possible to use the controller anytime and anywhere like a general general-purpose mouse.

The technical task to be achieved by the present embodiment is not limited to the technical task as described above, and other technical tasks may be inferred from the following embodiments.

Technical Solution

An electronic device capable of performing both an action of a general-purpose mouse and an action of controlling content through motion tracking and touch sensing in a three-dimensional space may be provided.

Advantageous Effects

An electronic device that is comfortable to wear, intuitive, and does not require learning how to operate the device may be provided.

Since the electronic device is easy to carry, a variety of content on smartphones, TVs, computers, tablet PCs, holograms, and head mount displays (HMDs may be easily and precisely controlled anytime and anywhere.

BEST MODE FOR CARRYING OUT THE INVENTION

Figure 1A:
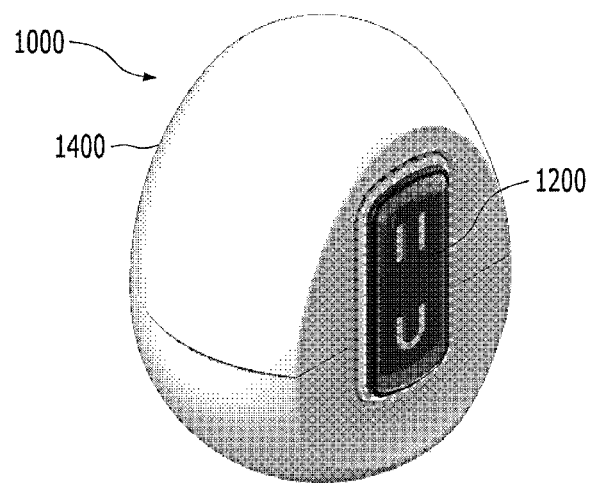
FIG. 1a shows an electronic device (in a closed state) for controlling a host device, according to an embodiment.

An electronic device, which is paired with a host device to control content of the host device, includes a touch sensing module, a movement sensing module for acquiring first movement information of the electronic device based on an accelerometer, a gyroscope, and a magnetometer, and a control signal output unit for acquiring second movement information through operation of the first movement information, and determining, under a gesture mode, a motion corresponding to the movement of the electronic device based on the second movement information and outputting a motion signal indicating the determined motion to the host device, and determining, under a mouse mode, a mouse action based on at least one of touch information acquired from the touch sensing module and the second movement information and outputting a mouse signal indicating the mouse action, wherein the first movement information may include at least one of acceleration data obtained through the accelerometer and angular velocity data obtained through the gyroscope, the movement sensing module may transmit the first movement information to the control signal output unit through an internal bus, the second movement information may include at least one of angle data, distance data, velocity data, and direction data, the mouse signal may include a mouse click, a mouse scroll, a mouse move, or a mouse drag, and switching between the mouse mode and the gesture mode may be performed by a touch action sensed by the touch sensing module.

The distance data includes distance data for each of an x-axis direction, a y-axis direction, and a z-axis direction, the velocity data may include velocity data for each of the x-axis direction, the y-axis direction, and the z-axis direction, and the direction data may include information on whether there is an increase or decrease in the x-axis direction, whether there is an increase or decrease in the y-axis direction, and whether there is an increase or decrease in the z-axis direction.

The control signal output unit may be configured to determine, under the gesture mode, a motion corresponding to the second movement information among predefined motions for controlling the host device, wherein the predefined motions include a move and a rotation.

The predefined motions may further include a user-defined motion, wherein the user-defined motion may be defined by allowing a user holding the electronic device in his or her hand or wearing the electronic device to repeatedly take a specific movement, and allowing the user to match the specific movement with the user-defined motion.

The control signal output unit may determine, if the user of the electronic device is a first user, a corresponding motion by inputting the second movement information of the first user into a first decision model, and may determines, if the user of the electronic device is a second user, a corresponding motion by inputting the second movement information of the second user into a second decision model, wherein the first decision model is generated based on a machine learning technique in which the second movement information of the first user and a specific motion are repeatedly applied as an input and an output, respectively, and the second decision model is generated based on a machine learning technique in which the second movement information of the second user and a specific motion are repeatedly applied as an input and an output, respectively.

The motion sensing module may further include a sensor fusion unit for acquiring the first motion information optimized by compensating and fusing data obtained from each of the accelerometer, the gyroscope, and the magnetometer based on a filter or algorithm.

The control signal output unit may include a processor for acquiring the second movement information by operating the first movement information, and for determining the motion or mouse action corresponding to the movement of the electronic device based on the second movement information, and a communication unit for transmitting the motion signal or the mouse signal to the host device based on a wireless communication interface.

The processor may acquire the second movement information every reference time, wherein the reference time may be 30 ms or less.

The processor may obtain the velocity data and the distance data by performing an integral operation on linear acceleration data obtained by removing a gravitational acceleration component from the acceleration data.

The processor may obtain the angle data by performing an integral operation on the angular velocity data, and may obtain the direction data based on a comparison between current distance data and previous distance data.

The control signal output unit distinguishes, under the mouse mode, between when a user of the electronic device is using a keyboard and when the user of the electronic device is using a mouse, and may not output the mouse signal when it is determined that the user is using a keyboard.

A battery for supplying power required for the operation of at least one of the touch sensing module, the movement sensing module, and the control signal output unit may be further included.

A case for embedding the touch sensing module, the movement sensing module, and the control signal output unit may be further included, wherein a connection part for allowing a user to wear the case on a finger or to fix the case to a finger may be further included.

A cradle device for receiving the case and the connection part is further included, wherein the battery is charged through the cradle device, a center of gravity pendulum is positioned at the bottom of the cradle device, and when the case and the connection part are accommodated in the cradle device, one surface of the case may be exposed.

The touch sensing module may include a first touch region, a second touch region, and a third touch region, wherein the control signal output unit may determine, under the mouse mode, the mouse action as the mouse click if a touch action sensed by the touch sensing module is a touch only to the first touch region or a simultaneous touch to the first touch region and the second touch region, and may determine the mouse action as the mouse scroll if a touch action sensed by the touch sensing module is a sequential touch to the first touch region, the second touch region, and the third touch region.

MODE FOR CARRYING OUT THE INVENTION

Below, some embodiments will be described clearly and in detail with reference to the accompanying drawings so that those of ordinary skill in the art (hereinafter, referred to as those skilled in the art) to which the present invention belongs may easily practice the present invention.

Also, as used herein, the term "unit" or "module" may refer to a hardware component or a circuit such as a field programmable gate array (FPGA) or an application specific integrated circuit (ASIC).

Hereinafter, "content" may include, but is not limited to, media themselves, such as games, music, movies, images, animations, characters, items, objects, and the like, or objects reproduced on the media. The "content" may include an operating system or software running on a host device. The software may include a document program, such as a word processor or PowerPoint, an image processing program for performing professional tasks, a CAD program, and a game. The "content" may include virtual content generated in virtual reality such as AR/VR/MR. The "content" may include an object reproduced on a two-dimensional screen, or a three-dimensional object displayed on a three-dimensional space such as a hologram. The "content" may be created, executed, or reproduced by the host device. When the "content" is virtual content (e.g., a hologram) displayed on a three-dimensional space, the physical location of the host device and the physical location of the "content" may be different from each other.

Hereinafter, a "motion" is a meaningful movement taken by a user to control content, and may be captured, extracted, recognized, analyzed, or determined from the user's movement.

Hereinafter, a "control signal" is a signal including information on a motion itself or the type of a motion, and an electronic device may generate a "control signal" and a host device may operate or control content based on the "control signal" received from the electronic device. For example, the "control signal" may be in the form of a bit string, and each motion may be represented by a different bit string.

Figure 1B:
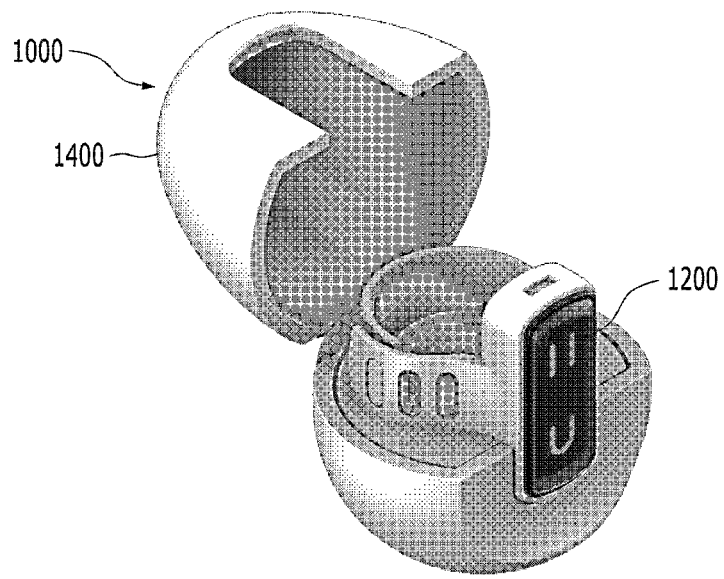
FIG. 1b shows an electronic device (in an open state) for controlling a host device, according to an embodiment.

FIG. 1a shows an electronic device (in a closed state) for controlling a host device, according to an embodiment. FIG. 1b shows an electronic device (in an open state) for controlling a host device, according to an embodiment.

A user may control a host device by a touch or movement of a hand while holding or having an electronic device 1000 in his or her hand. The host device may include various types of electronic devices. For example, the host device may include a game machine, a smart phone, a tablet personal computer (PC), a TV, a desktop PC, a notebook PC, a mobile medical device, a camera, or a wearable device (e.g., electronic glasses, electronic clothing, an electronic wristband, an electronic necklace, an electronic accessory, an electronic tattoo, or a smart watch), but is not limited thereto. For example, the host device may include a head mounted display (HMD) for displaying virtual content and a game machine (e.g., a console device) for executing or reproducing a virtual reality game or virtual reality content. The host device may include a computer for displaying a presentation material.

Referring to FIG. 1a and FIG. 1b together, the electronic device 1000 may include a ring-shaped device 1200 which may be worn on a user's finger and a cradle device 1400 for accommodating the ring-shaped device 1200. The user may accommodate the ring-shaped device 1200 in the cradle device 1400 and close a lid.

In a state in which the ring-shaped device 1200 is accommodated in the cradle device 1400 and the lid of the cradle device 1400 is closed, a front portion (a head portion, a front surface (or one surface) of a main module 1240 to be described later) of the ring-shaped device 1200 is exposed on a front surface of the cradle device 1400, and the user may generate a motion signal by moving while holding the cradle device 1400 in his or her hand, or may perform a touch action by touching the exposed front portion of the ring-shaped device 1200. According to an embodiment, a touch sensing module may be positioned in the front portion of the ring-shaped device 1200.

The user may open the lid of the cradle device 1400 to take out the ring-shaped device 1200. The user may control the host device by a touch action or a motion while wearing the ring-shaped device 1200 on his or her finger. The cradle device 1400 may be manufactured in a shape that is easy for people to hold in their hands, and the center of gravity of the cradle device 1400 may be designed to be low due to a center of gravity pendulum positioned at the bottom of the cradle device 1400. The cradle device 1400 may include a charging terminal and a power supply device for charging the ring-shaped device 1200.

The ring-shaped device 1200 may include a motion sensor for acquiring movement information of a user, and a touch sensor for acquiring touch information of the user. The ring-shaped device 1200 may generate a control signal based on the acquired movement information and touch information, and may output the generated control signal to the host device. The host device may control content based on the control signal received from the ring-shaped device 1200.

Figure 2A:
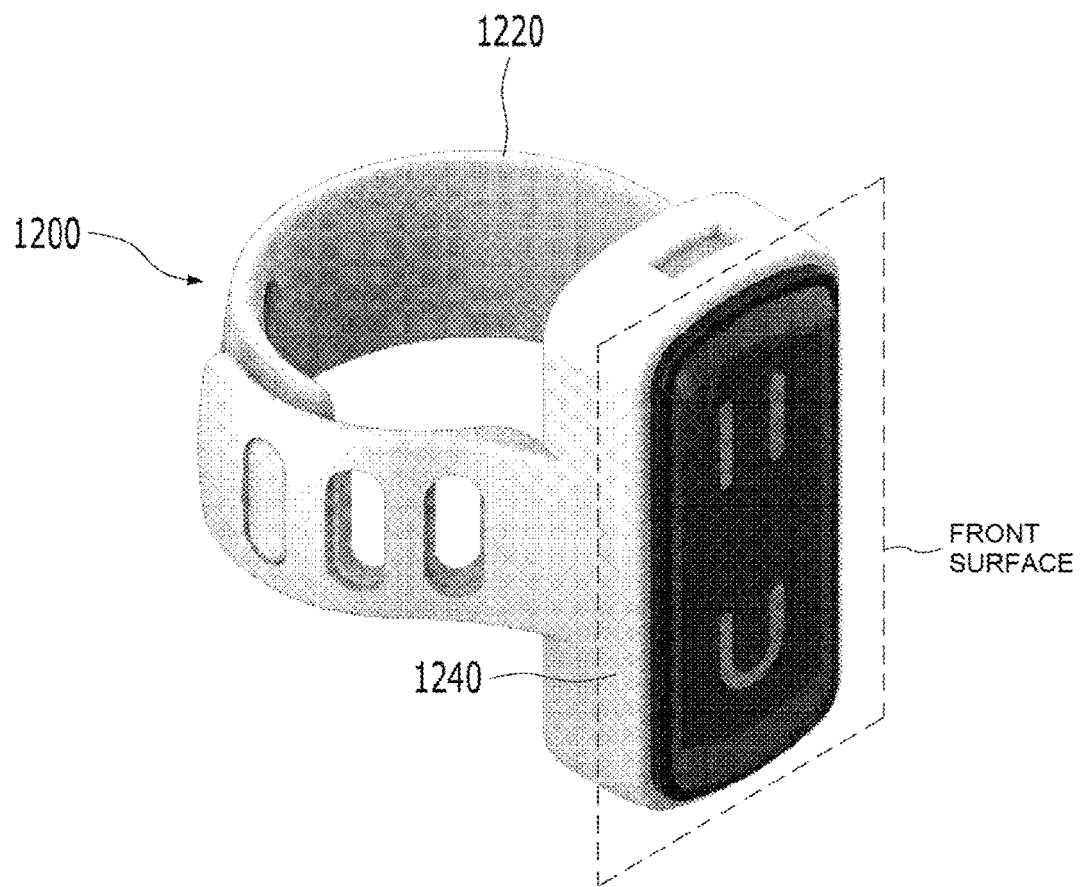
FIG. 2a shows a ring-shaped device in an electronic device, according to an embodiment.
Figure 2B:
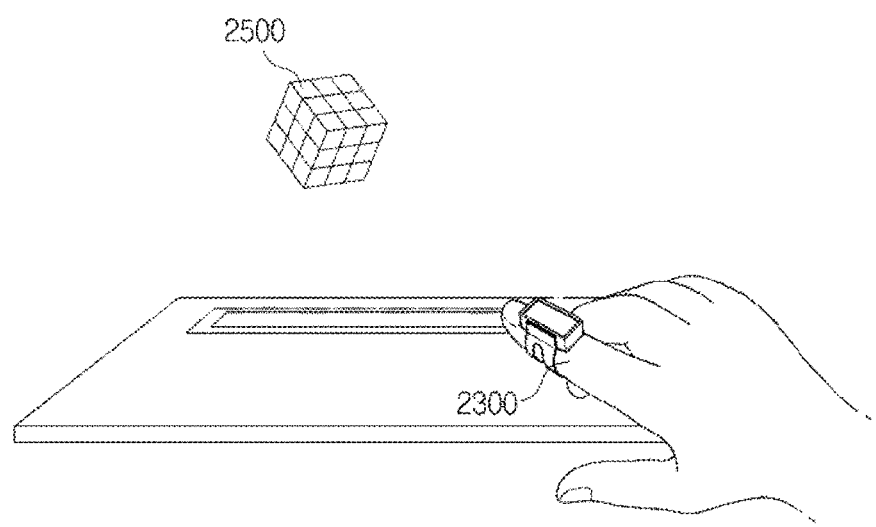
FIG. 2b shows controlling content using an electronic device, according to an embodiment.

FIG. 2a shows a ring-shaped device, according to an embodiment. and FIG. 2b shows a user controlling content while wearing the ring-shaped device, according to an embodiment.

Referring to FIGS. 2a and 2b together, the ring-shaped device 1200 may be a small wearable device which may be attached to, connected to, or worn on a human body or an object. The ring-shaped device 1200 is comfortable to wear, and the user may intuitively operate functions of the ring-shaped device 1200 without separate learning. Furthermore, the ring-shaped device 1200 may be used as a general-purpose device, such as a general-purpose mouse, by using movement information and touch information.

The ring-shaped device 1200 may include a connection part 1220 to be worn on a user's finger 2300 and a main module 1240 for acquiring movement information and touch information by using a sensor. The connection part 1220 may be composed of a material such as silicon or a metal. The main module 1240 may acquire touch information and movement information of the user and may output a control signal corresponding to the acquired information. The main module 1240 may mean components of an electronic device 3000 to be described later and a case in which the components are embedded. According to an embodiment, the main module 1240 may be separated from the connection part 1220, and the user may insert, attach, or embed only the main module 1240 into various types of objects (a wand, a dice, a pen, etc.), and may control a host device by using the various types of objects.

The main module 1240 may output a control signal for controlling content 2500 by acquiring touch information and movement information (e.g., angular velocity, acceleration, velocity, distance, angle, direction, and position (three-dimensional spatial coordinates) information for the movement of the main module 1240), and processing and treating the information.

Although the ring-shaped device 1200 is illustrated as being worn on a user's finger 2300 in FIG. 2b, the ring-shaped device 1200 may be connected to or attached to other types of objects.

For example, the main module 1240 may be embedded in a dice and the content 2500 may be controlled based on the movement of the dice. Alternatively, the main module 1240 may be attached to a wand and the content 2500 may be controlled based on the movement of the wand. Alternatively, the main module 1240 may be embedded in a pen and the content 2500 on a smart phone may be controlled based on the movement of the pen. Hereinafter, an object may mean a body part (e.g., a finger) of a person, an object which a person may wear or lift, or the electronic device 3000 itself to be described later.

In addition, although the content 2500 is illustrated as a hologram object in a three-dimensional space in FIG. 2b, the content 2500 may include any form of content or software (Microsoft Office of Microsoft, games, etc.) reproduced in a host device.

Figure 3:
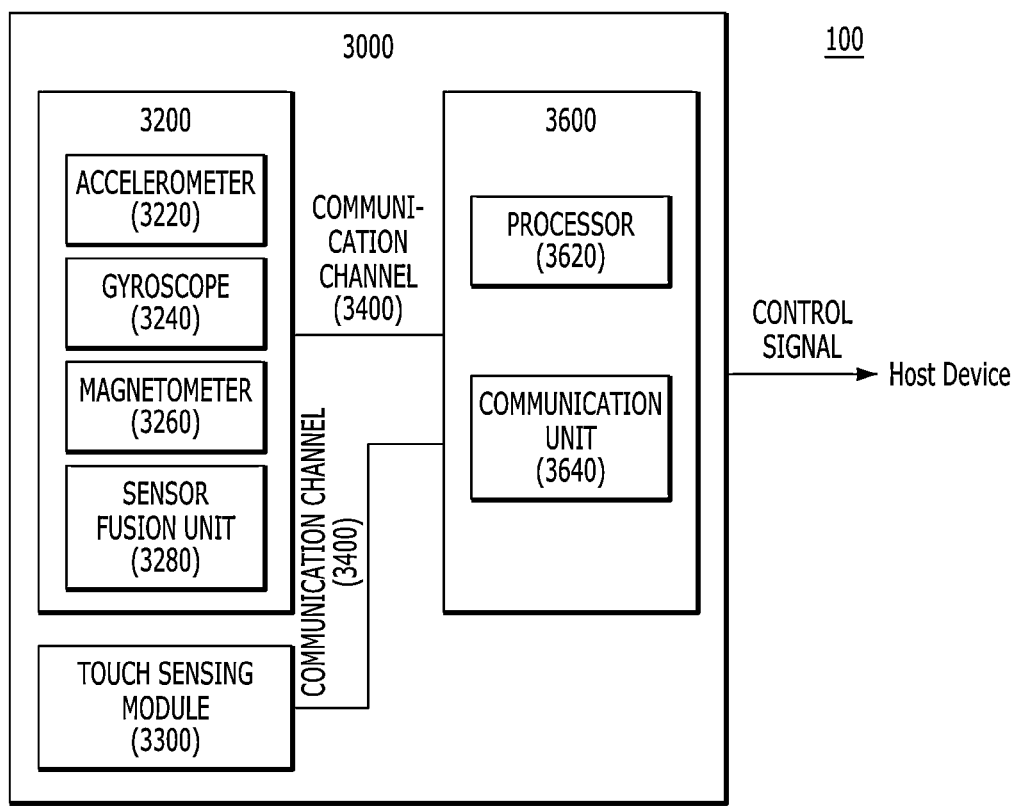
FIG. 3 shows a system including an electronic device, according to an embodiment.

FIG. 3 shows a system including an electronic device, according to an embodiment.

Referring to FIG. 3, a system 100 may include the electronic device 3000 and a host device (or a target device) The electronic device 3000 may be connected to the host device through a wireless communication method. For example, the electronic device 3000 may be paired with the host device by a Bluetooth method. The electronic device 3000 may mean the cradle device 1400 in which the ring-shaped device 1200 of FIG. 1a is accommodated, the ring-shaped device 1200 separated from the cradle device 1400, or the main module 1240 of the ring-shaped device 1200 of FIG. 2a.

A user may use the electronic device 3000 to control a variety of content of the host device. According to an embodiment, the user may control the content of the host device based on the movement of the electronic device 3000 itself or the movement of an object connected to the electronic device 3000 and/or a user's touch action which is input to the electronic device 3000. For example, the user may control a variety of content of the host device by wearing the electronic device 3000 on his or her finger and moving the finger or by touching the electronic device 3000 with his or her finger.

Referring to FIG. 3, the electronic device 3000 may include a movement sensing module 3200, a touch sensing module 3300, a communication channel 3400, and a control signal output unit 3600.

The electronic device 3000 may operate in a mouse mode or a gesture mode. Under the mouse mode, the electronic device 3000 may operate like a general-purpose mouse, and under the gesture mode, the electronic device 3000 may operate as a motion recognition device.

Under the mouse mode, the electronic device 3000 may determine a mouse action based on at least one of a touch action sensed through the touch sensing module 3300 and movement information sensed through the movement sensing module 3200 and may output a mouse signal indicating the mouse action.

For example, a mouse click may be performed by touching one surface of the electronic device 3000 once, and a mouse double click is performed by touching one surface of the electronic device 3000 twice within a reference time, a mouse move may be determined from movement information (e.g., second movement information to be described below) of the electronic device 3000, a mouse scroll (Scroll Up/Down) may be determined by a continuous change in touch (e.g., the scroll up is the movement of sweeping one surface of the electronic device 3000 from left to right with a finger, and the scroll down is the movement of sweeping one surface of the electronic device 3000 from right to left with a finger), and a mouse drag may be determined by a touch time (e.g., a long touch) and movement information of the electronic device 3000. According to an embodiment, if the touch time is within 200 ms, it may be determined as a short touch, and if the touch time is 500 ms or longer, it may be determined as a long touch. One surface of the electronic device 3000 on which a touch is performed may be the front portion which has been described with reference to FIG. 2a as the touch sensing module 3300.

Under the gesture mode, the electronic device 3000 may acquire the movement information of the electronic device 3000 using a sensor, and may determine a motion corresponding to the movement of the electronic device 3000 based on the acquired movement information. The electronic device 3000 may output a motion signal indicating the determined motion to the host device. According to an embodiment, the movement information may include characteristics (e.g., at least one of angular velocity, acceleration, velocity, distance, angle, direction, and position) about the movement of an object.

Hereinafter, operations and functions of components of the electronic device 3000 will be described.

Referring to FIG. 3, the touch sensing module 3300 may sense a user's touch. For example, when a user touches the front portion of the ring-shaped device 1200 with his or her thumb while the user is wearing the ring-shaped device 1200 on his or her index finger, the touch sensing module 3300 may sense a touch action. The touch action sensed by the touch sensing module 3300 may be transmitted to the control signal output unit 3600 through the communication channel 3400.

The touch action sensed by the touch sensing module 3300 may be used to determine a mouse action under the above-described mouse mode. Alternatively, the touch action sensed by the touch sensing module 3300 may be used to determine a motion corresponding to the movement of an object under the gesture mode. Also, the touch action sensed by the touch sensing module 3300 may be used to switch between the mouse mode and the gesture mode.

The switching between the mouse mode and the gesture mode may be performed by a touch action. For example, when a user's short touch, short touch, and long touch are continuously sensed through the touch sensing module 3300, the gesture mode may be switched to the mouse mode or the mouse mode may be switched to the gesture mode. Alternatively, when a central portion in the front portion of the ring-shaped device 1200 is touched for longer than a reference time through the touch sensing module 3300, the gesture mode may be switched to the mouse mode or the mouse mode may be switched to the gesture mode.

The movement sensing module 3200 may acquire first movement information of the electronic device 3000. The first movement information may be used in both the mouse mode and the gesture mode. The first movement information may include at least one of acceleration data obtained through an accelerometer and angular velocity data obtained through a gyroscope.

The movement sensing module 3200 may include an accelerometer 3220, a gyroscope 3240, a magnetometer 3260, and a sensor fusion unit 3280. The gyroscope 3240 according to an embodiment is a sensor for measuring angular velocity. The accelerometer 3220 according to an embodiment is a sensor for measuring acceleration and measuring dynamic forces such as vibration, impact, and the like. The magnetometer 3260 according to an embodiment is a sensor for measuring Earth magnetism and detecting the magnitude thereof.

A value measured by the gyroscope 3240 may have an error due to the influence of temperature, and the error may accumulate in an integration process, which may cause a phenomenon in which a final value is drifted. Therefore, it is necessary to use a temperature sensor as well so as to compensate for an error of the gyroscope 3240.

In view of a long time in a stationary state, a tilted angle calculated by the accelerometer 3220 indicates a correct value, but the gyroscope 3240 may indicate an incorrect value due to cumulative drift over time. On the contrary, in view of a short moving time, the gyroscope 3240 may indicate correct angular velocity, but the accelerometer 3220 may derive a calculated value different from the tilted angle. In addition, when a subject moves in a straight direction in the stationary state, it is impossible to measure a tilt.

Therefore, in order to use both the accelerometer 3220 and the gyroscope 3240 and supplement and compensate for shortcomings of each thereof, a filter such as a Kalman filter or a compensation and fusion algorithm may be applied. However, despite such a compensation and fusion operation, when only the gyroscope 3240 and the accelerometer 3220 are used, an error rate increases when operating coordinates in a three-dimensional space, so that the gyroscope 3240 and the accelerometer 3220 are not suitable to be used as an interface for controlling a host device such as a VR device. In addition, when only the accelerometer 3220 and the gyroscope 3240 are used, it is difficult to determine the absolute position of a moving subject because a relative azimuth is used instead of an absolute azimuth.

Therefore, the movement sensing module 3200 further includes the magnetometer 3260, so that a change in absolute azimuth measured by the magnetometer 3260 is calculated together with data measured by the accelerometer 3220 and the gyroscope 3240 to generate data with a low error rate. By including the magnetometer 3260, the movement sensing module 3200 may further perfectly compensate for the cumulative drift generated in the gyroscope 3240, and the gyroscope 3240 may resolve a phenomenon of instantaneous magnetic field bouncing (a sudden large change in magnetic field) caused by a magnetic change of the magnetometer 3260, thereby playing a role of supplementing and compensating for each other's shortcomings.

According to an embodiment, the movement sensing module 3200 may include a 9-axis sensor capable of accurately obtaining position data in a three-dimensional space. The 9-axis sensor is a sensor composed of 3 axes of acceleration, 2 axes of gyro, 3 axes of geomagnetism, and 1 axis of temperature, and is a sensor capable of obtaining both a three-dimensional position and a rotation degree in a three-axis direction in the three-dimensional space.

Referring to FIG. 3, the movement sensing module 3200 is a sensor fusion unit 3280 for performing a sensor fusion operation that generates optimized position data by compensating and fusing outputs of sensors 3220, 3240, and 3260. The sensor fusion unit 3280 may generate first motion information by denoising, compensating for, and fusing data respectively obtained from the accelerometer 3220, the gyroscope 3240, and the magnetometer 3260, thereby optimizing the data. When raw data obtained by the sensors 3220, 3240, and 3260 is used as it is, accurate position data cannot be obtained, so that optimized position data may be generated by estimating an accurate position through a filter. For example, the sensor fusion operation may be performed based on a filter such as a Kalman filter or a data compensation and fusion algorithm.

The first movement information acquired through the movement sensing module 3200 may be transmitted to the control signal output unit 3600 through the communication channel 3400. According to an embodiment, the communication channel 3400 may be an internal bus in the electronic device 3000 for transmitting the first movement information to a processor 3620. The movement sensing module 3200 and the control signal output unit 3600 may exchange data with each other on the basis of a bus format of the communication channel 3400. For example, the bus format may include one or more of various interface protocols such as a universal serial bus (USB), a serial peripheral interface (SPI), and an inter-integrated circuit (I2C).

The control signal output unit 3600 may output a control signal for controlling the host device. The control signal may include a motion signal and a mouse signal. The control signal output unit 3600 may acquire second movement information through operation of the first movement information. The control signal output unit 3600 may determine, under the gesture mode, a motion corresponding to the movement of the electronic device 3000 based on the second movement information and may output a motion signal indicating the determined motion. The control signal output unit 3600 may determine, under the mouse mode, a mouse action based on at least one of touch information acquired from the touch sensing module 3300 and the second motion information and may output a mouse signal indicating the mouse action. The control signal may be an interrupt signal for controlling content of the host device. For example, the control signal may include a bit string indicating a specific mouse signal or a specific motion signal.

The control signal output unit 3600 may generate the second movement information by operating the first movement information received through the communication channel 3400. The second movement information may include at least one of angle data, distance data, velocity data, and direction data of the electronic device 3000. The second movement information of the electronic device 3000 may be utilized in both the mouse mode and the gesture mode. For example, under the mouse mode, the second movement information may be utilized to determine a mouse move action of the electronic device 3000. Under the gesture mode, the second movement information may be utilized to determine various motion signals output from the electronic device 3000.

According to an embodiment, the control signal output unit 3600 may include the processor 3620 and a communication unit 3640.

The processor 3620 may generate the second movement information by operating the first movement information received from the movement sensing module 3200 through the communication channel 3400. The second movement information may include at least one of angle data, distance data, velocity data, and direction data for a movement. The processor 3620 may acquire the second movement information by performing operation on the first movement information every reference time (e.g., 5 ms). The reference time may be 30 ms or less, but is not limited thereto.

The angle data may include angle data for each of an x-axis direction, a y-axis direction, and a z-axis direction. According to an embodiment, the processor 3620 may obtain the angle data by performing an integral operation on angular velocity data.

The velocity data may include velocity data for each of the x-axis direction, the y-axis direction, and the z-axis direction. The distance data may include distance data for each of the x-axis direction, the y-axis direction, and the z-axis direction. According to an embodiment, the processor 3620 may obtain the velocity data and the distance data by performing an integral operation on acceleration data. The processor 3620 may obtain linear acceleration data by removing a gravitational acceleration component from the acceleration data. The processor 3620 may obtain the velocity data by performing an integral operation on the linear acceleration data, and may obtain the distance data by performing an integral operation on the velocity data again.

The direction data relates to a direction of an object's instantaneous movement, and may include whether there is an increase or decrease in the x-axis direction, whether there is an increase or decrease in the y-axis direction, and whether there is an increase or decrease in the z-axis direction. According to an embodiment, the processor 3620 may include the direction data based on a comparison between current distance data and previous distance data. For example, if the current distance data has an x-axis direction value of +50, an y-axis direction value of +10, and an z-axis direction value of −5, and the previous distance data has an x-axis direction value of +60, an y-axis direction value of +15, and an z-axis direction value of −10, the processor 3620 may determine that a current movement direction is increased in the x-axis direction, increased in the y-axis direction, and decreased in the z-axis direction.

Figure 4A:
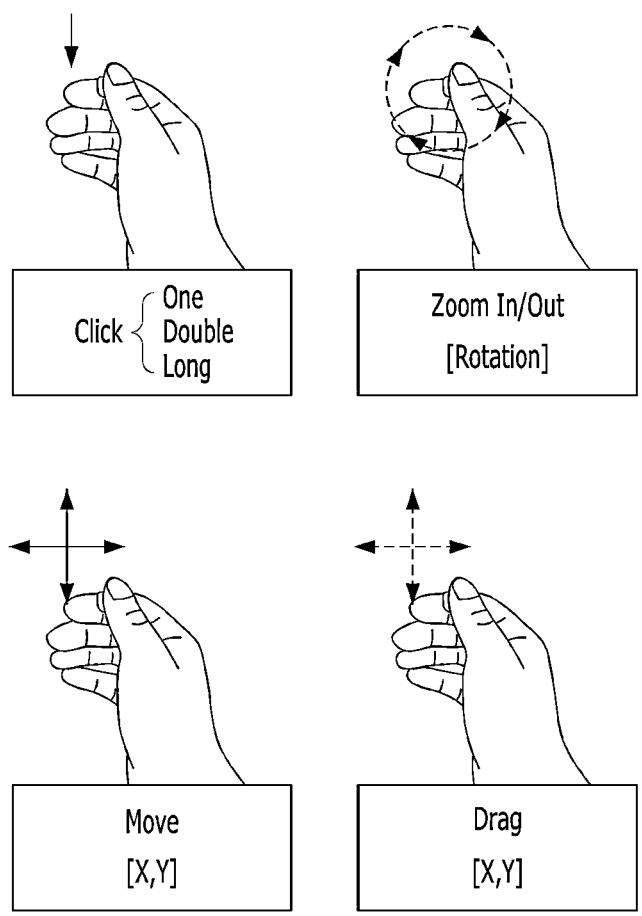
FIG. 4a shows mouse actions performed by an electronic device under a mouse mode, according to an embodiment.

Under the mouse mode, the processor 3620 may determine a corresponding mouse action based on the touch information acquired from the touch sensing module 3300 and the second movement information. FIG. 4*a* shows mouse actions performed by the electronic device 3000 under the mouse mode, according to an embodiment. The mouse action may include a mouse click, a zoom in/out (or scroll up/down), a mouse move, and a mouse drag. The mouse click may include a one click, a double click, and a long click. The mouse move may move a mouse pointer of the host device.

Figure 4B:
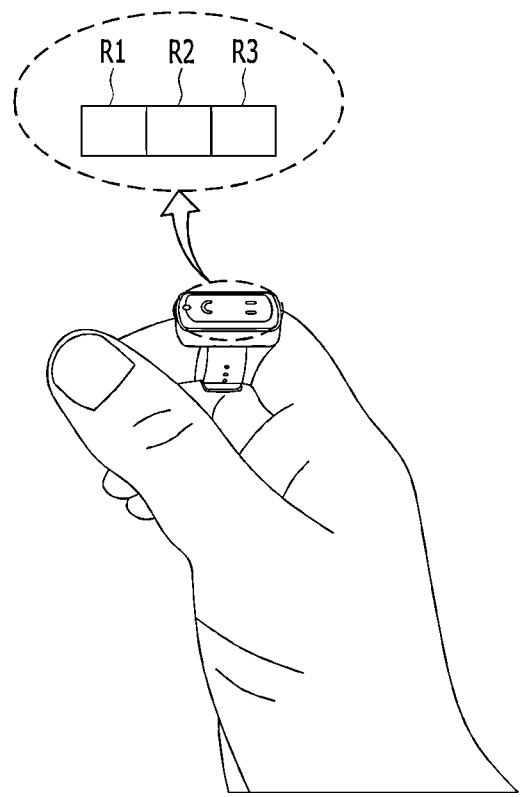
FIG. 4b shows that a front portion of an electronic device is divided into three touch regions, according to an embodiment.

Referring to FIG. 4B, in order to recognize a mouse action under the mouse mode, a surface (the front surface of the main module 1240 in FIG. 2*a*) of the touch sensing module 3300 of the electronic device 3000 may be divided into a touch region R1 positioned on the left side, a touch region R2 positioned in the middle, and a touch region R3 positioned on the right side. A mouse signal may be determined by the touch sensing module 3300 sensing a touch action to at least one of the touch region R1, the touch region R2, and the touch region R3.

Figure 4C:
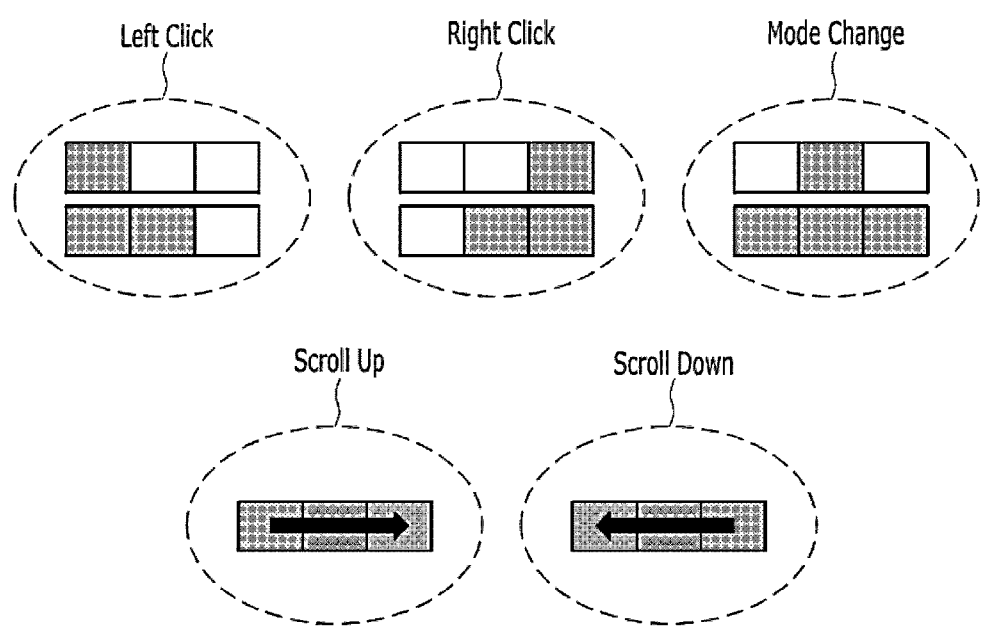
FIG. 4c shows mouse actions recognized using three regions, according to an embodiment.

Referring to FIG. 4*c*, when a user touches only the touch region R1 or touches the touch region R1 and the touch region R2 simultaneously, the corresponding action may be determined as a mouse left click. When the user touches only the touch region R3 or touches the touch region R3 and the touch region R2 simultaneously, the corresponding action may be determined as a mouse right click. When the user touches only the touch region R2 or touches the touch region R2, the touch region R1 simultaneously, and the touch area R3, the corresponding action may be determined as a mode change between the mouse mode and the gesture mode. When the user sequentially and continuously touches the touch region R1, the touch region R2, and the touch region R3, the corresponding action may be determined as a mouse scroll up. When the user sequentially and continuously touches the touch region R3, the touch region R2, and the touch region R1, the corresponding action may be determined as a mouse scroll down.

The processor 3620 may distinguish, under the mouse mode, between when a user is using a keyboard and when the user is using a mouse, and may not output a mouse signal when it is determined that the user is using a keyboard.

Under the gesture mode, the processor 3620 may determine a motion corresponding to the movement of the electronic device 3000 based on the second movement information. For example, the processor 3620 may determine, based on the second movement information, one motion corresponding to the movement of the electronic device 3000 among predefined motions. The processor 3620 may generate a motion signal indicating the determined motion and may transmit the generated motion signal to the host device through the communication unit 3640. If the distance between the electronic device 3000 and the host device is greater than a reference distance, or the movement of the electronic device 3000 either does not correspond to any one of the predefined motions or is determined to be a meaningless movement, the processor 3620 may process the case as an exception.

The predefined motions may include a move, a tap, a grasp, a scroll, a swipe, a gesture, a rotation, and the like. The move motion is an action of moving the electronic device 3000 in an arbitrary direction, and may be used for an action of moving virtual content, turning a page, or the like. For example, the move motion may include a movement in a three-axis (x, y, z axes) direction. The tap motion is an action of tapping on something, and may be used to select or click virtual content. A user may double-click the virtual content by taking the tap motion twice in a row within the reference time. The tap motion is a separate action from a click action under the mouse mode. The grasp motion is an action in which two distant objects come into contact with each other, and may be used to grasp the virtual content. The gesture may mean a movement for expressing a text, a symbol, or a shape (e.g., '?' or 'X').

A predefined motion may be added by a user-defined motion. The user-defined motion is a motion defined by a user rather than a manufacturer of the electronic device 3000, and the user may add a specific movement input by him/herself as the user-defined motion. For example, the user may repeatedly take a specific movement while holding the electronic device 3000 in his or her hand or wearing the electronic device 3000 and may match the specific movement with a specific function or motion. Information on the movement repeatedly taken by the user and a function or motion corresponding to the movement information may be stored in the electronic device 3000. For example, a user wearing the electronic device 3000 on his or her finger may take a poking action 10 times as if poking something and designate and store the action as a poking motion. Thereafter, when the user wears the electronic device 3000 and performs a poking motion, the processor 3620 may transmit a motion signal indicating the poking motion to the host device through the communication unit 3640.

The movement information of the electronic device 3000 may be matched with a specific motion or a predefined motion based on machine learning. That is, when specific movement information is input to a decision model learned through machine learning, the decision model may output a motion signal corresponding to the input specific movement information.

According to an embodiment, the electronic device 3000 may use an independent decision model for each user. This is because generated movement information is different for each user even if the users make the same movement. For example, assuming that an action of turning an arm to draw a circle corresponds to a specific motion signal output from the electronic device 3000 or a specific function in the host device, This is because movement information generated while each user is performing the above action is not all the same and may have a unique pattern for each user. Alternatively, motion information generated while each user is performing a left move action is not all the same and may have a unique pattern for each user.

Figure 5:
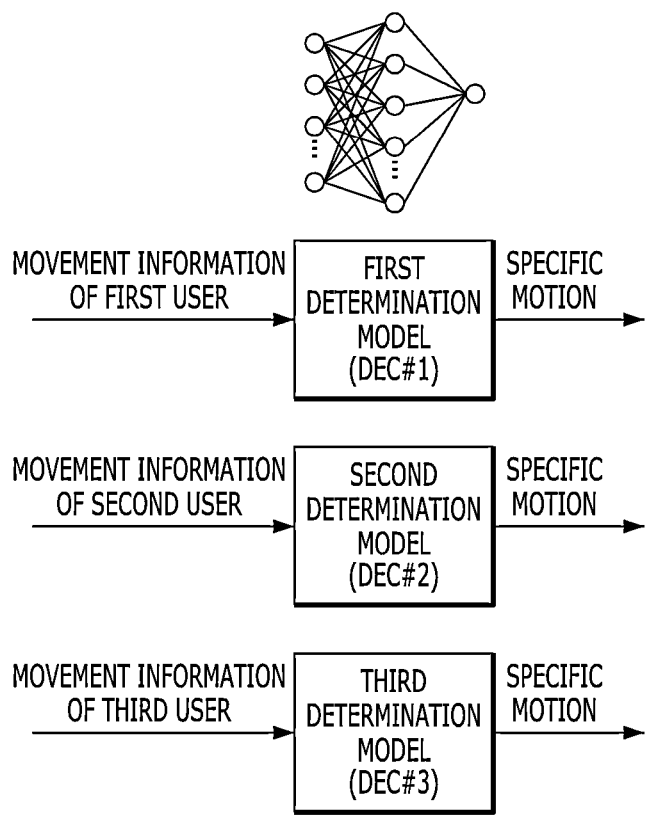
FIG. 5 shows a decision model for determining a motion corresponding to the movement information of a user, according to an embodiment.

Referring to FIG. 5, a first decision model DEC #1, a second decision model DEC #2, and a third decision model DEC #3 may be used to output a corresponding motion signal from movement information of a first user, movement information of a second user, and movement information of a third user, respectively. If a user currently using the electronic device 3000 is the first user, the control signal output unit 3600 or the processor 3620 may input the obtained movement information (e.g., the above-described second movement information) of the first user to the first decision model DEC #1 and determine a corresponding motion signal. If a user currently using the electronic device 3000 is the third user, the control signal output unit 3600 or the processor 3620 may input the obtained movement information (e.g., the above-described second movement information) of the third user to the third decision model DEC #3 and determine a corresponding motion.

A decision model for determining a motion signal may be generated based on machine learning. For example, the first decision model DEC #1 may be generated by performing machine learning in which the movement information (e.g., the above-described second movement information) of the first user and a specific motion are repeatedly applied as an input and an output, respectively. The first decision model DEC #1 may receive 10 times or more of the second movement information of the first user generated from the first user's action of turning his or her arm to draw a circle, and may be learned such that the received movement information corresponds to a specific motion signal. For example, the second decision model DEC #2 may be generated by performing machine learning in which the movement information (e.g., the above-described second movement information) of the second user and a specific motion are repeatedly applied as an input and an output, respectively. The second decision model DEC #2 may receive 10 times or more of the second movement information of the second user generated from the second user's action of turning his or her arm to draw a circle, and may be learned such that the received movement information corresponds to a specific motion signal.

A machine learning technique may include Support Vector Machine (SVM), Random forest, Support Vector Machine (SVM), Naive Bayes, Adaptive Boosting (Ada-Boost), Random Forest, Gradient Boosting, K-means clustering, Artificial Neural Network, and the like.

A machine learning-based decision model used for determining a motion signal may be stored in a memory (not shown) in the electronic device 3000 or stored in a host device. In addition, learning for generating a decision model may be performed in the electronic device 3000 or may be performed in the host device. According to an embodiment, the learning for generating a decision model may be performed in the host device, and the generated decision model may be stored in a memory (not shown) in the electronic device 3000. Alternatively, the learning with respect to a decision model may be performed in the electronic device 3000 and the decision model may be stored in a memory (not shown) of the electronic device 3000.

Figure 6:
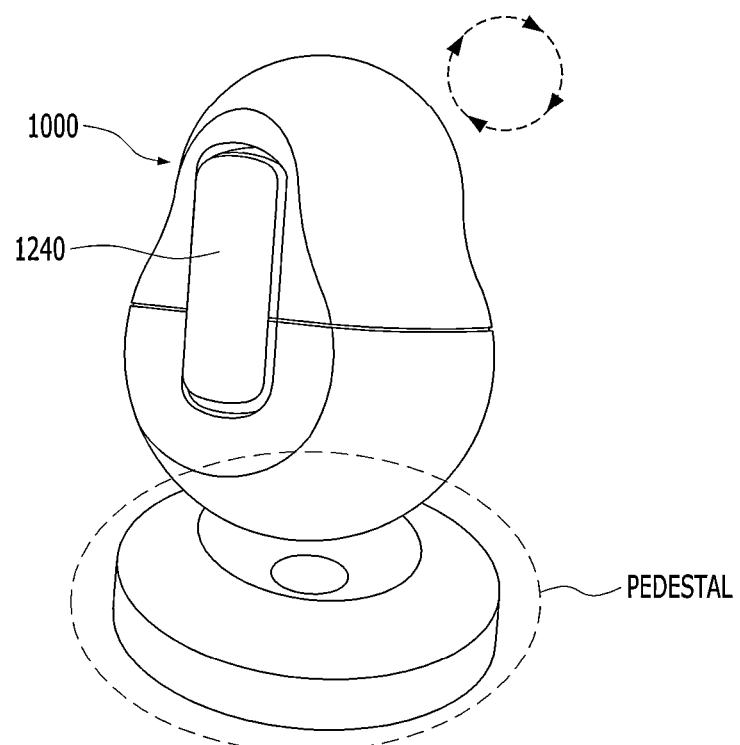
FIG. 6 shows a joystick using an electronic device, according to an embodiment.

FIG. 6 shows that an electronic device 1000 is used like a joystick, according to an embodiment. Referring to FIG. 6, the electronic device 1000 may be placed on a pedestal and operate like a joystick. As the electronic device 1000 rotates on the pedestal, a mouse move action may be performed and mouse pointer may be controlled. A user may perform various mouse actions by touching a front portion of a main module 1240 of the electronic device 1000. A mouse action is the same as described above with reference to FIGS. 4a to 4c.

Figure 7:
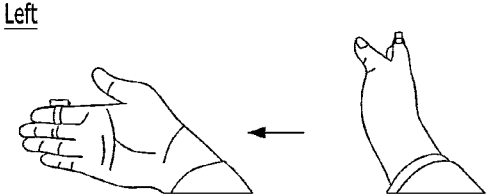
FIG. 7 shows motions for controlling a host device with an electronic device under a gesture mode, according to an embodiment.
Figure 7:
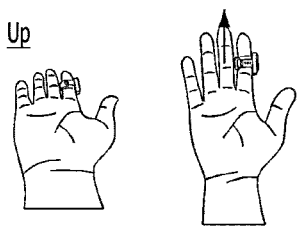
Figure 7:
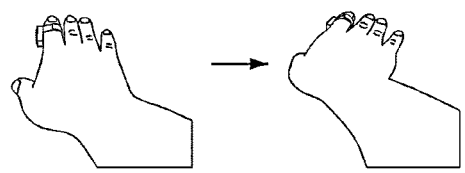
Figure 7:
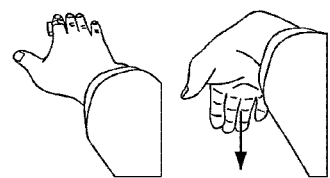
Figure 7:
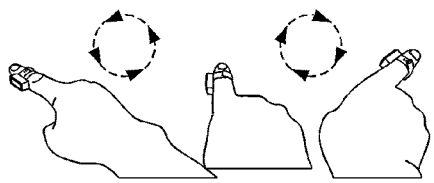
Figure 7:
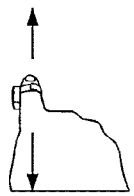

FIG. 7 shows a left move motion, a right move motion, an up move motion, a down move motion, a rotation (a clockwise rotation, a counter clockwise rotation) motion, and a forward/back motion for controlling a host device with the electronic device 3000 under the gesture mode, according to an embodiment. The left move motion and the right move motion may be determined from the movement in the x-axis+/−direction. The up move motion and the down move motion may be determined from the movement in the z-axis+/−direction. The forward move motion and the back move motion may be determined from the movement in the y-axis+/−direction. According to an embodiment, a user may use the gesture mode while wearing the ring-shaped device 1200 on his or her finger, but the embodiment is not limited thereto.

In this embodiment, the user may take the left move or right move motion in a three-dimensional space while wearing the electronic device 3000 to turn pages of a word document running on the host device. Under the gesture mode, a motion for the electronic device 3000 to control the host device is not limited to the above-described embodiment. For example, motions supported by the electronic device 3000 may further include a tap, a grasp, a scroll, a swipe, and the like. In addition, motions (including user-defined motions) under the gesture mode may be added and used by a user through the above-described machine learning-based decision model.

Referring back to FIG. 3, the processor 3620 may generate a control signal indicating a motion signal or a mouse signal. For example, when the user's movement is determined to be the left move motion, the processor 3620 may generate a first bit string indicating the left move motion as a control signal. When the user's movement is determined to be the clockwise rotation motion, the processor 3620 may generate a second bit string indicating the clockwise rotation motion as a control signal. Alternatively, in the case of using a protocol agreed upon between an electronic device 2000 and a host device, a number assigned to each motion may be generated as a control signal. When the user's movement is determined to be a mouse move under the mouse mode, the processor 3620 may generate a third bit string indicating the mouse move as a control signal.

The processor 3620 may include one processor core (single core), or a plurality of processor cores (multi-core) For example, the processor 3620 may include a multi-core such as a dual-core, a quad-core, a hexa-core, or the like. In addition, the processor 3620 may further include a cache memory positioned inside or outside thereof.

The communication unit 3640 may transmit a control signal to the host device through a wireless communication interface. The communication unit 3640 may include a wireless local area network (WLAN) such as Wireless Fidelity (Wi-Fi), a wireless personal area network (WPAN) such as Bluetooth, a Wireless Universal Serial Bus (USB), Zigbee, Near Field Communication (NFC), Radio-frequency identification (RFID), or a modem communication interface which may be connected to a mobile cellular network such as 3rd Generation (3G), 4th Generation (4G), Long Term Evolution (LTE), and the like. A Bluetooth interface may support Bluetooth Low Energy (BLE).

The electronic device 3000 may include a memory (not shown) required for an operation performed in the electronic device 3000. For example, the electronic device 3000 may include a memory (not shown) required for performing a sensor fusion operation in the sensor fusion unit 3280. In addition, the electronic device 3000 may include a memory (not shown) used to store predefined motions and/or a user-defined motion or required for an operation performed in the processor 3620. A memory (not shown) may store a decision model generated based on machine learning to determine a motion signal corresponding to a user's movement. A memory (not shown) may include a volatile memory device such as a dynamic random access memory (DRAM) and a static random access memory (SRAM), and a non-volatile memory device such as a flash memory device and a solid state drive (SSD).

The electronic device 3000 may include a battery (not shown) to supply power required for an operation performed in the electronic device 3000. The battery (not shown) may include, but is not limited to, a lithium ion battery or a lithium polymer battery. For example, the battery (not shown) may be included in the control signal output unit 3600, and some of power output from the battery (not shown) may be bypassed to the movement sensing module 3200.

The electronic device 3000 may include a charging terminal for charging the battery (not shown). The electronic device 3000 may include a USB-type charging terminal. An electric current entering through the charging terminal may be used to charge the battery. According to an embodiment, there may be a charging terminal in the ring-shaped device 1200 of FIGS. 1a and 1b, and there may be a charging terminal in the cradle device 1400. For example, there may be a charging terminal in the main module 1240, and as the ring-shaped device 1200 is accommodated in the cradle device 1400, the main module 1240 may be charged. A power supply device for charging the main module 1240 may be provided in the cradle device 1400.

Figure 8:
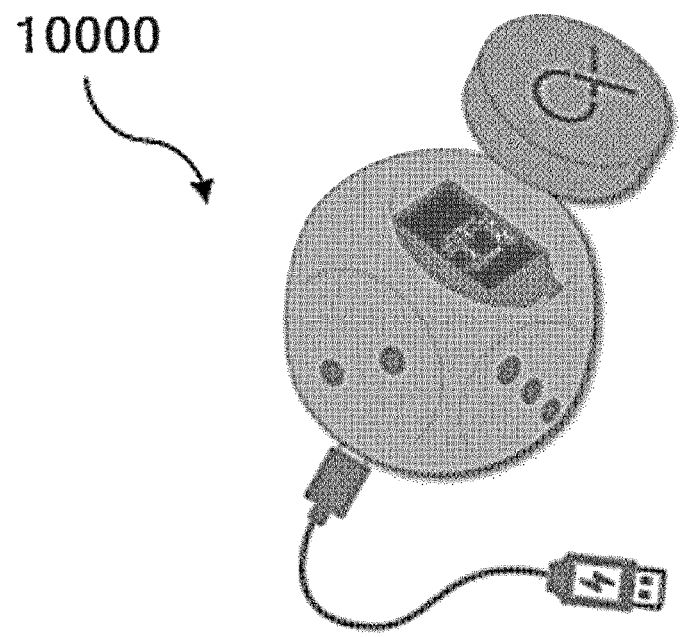
FIG. 8 shows a dice with an embedded electronic device, according to an embodiment.

FIG. 8 shows a dice with an embedded electronic device, according to an embodiment.

The dice is embedded with the electronic device 3000 described above with reference to FIGS. 2 and 3, and a user may enjoy an AR board game and the like using the dice.

The dice may include a sensing module for acquiring first movement information of the dice based on an accelerometer, a gyroscope, and a magnetometer, a control signal output unit for generating second movement information through operation of the first movement information of the dice and outputting a control signal corresponding to the movement of the dice to a host device based on the second movement information, and a battery for supplying power required for an operation of at least one of the sensing module and the control signal output unit.

According to an embodiment, the control signal output unit may include a processor for acquiring second movement information by operating the first movement information, and generating a control signal corresponding to the movement of the dice based on at least a piece of information of the second movement information and a communication unit for transmitting the control signal to a host device based on Bluetooth communication. The control signal output unit may determine a number indicated by the dice based on at least one among acceleration data, angular velocity data, velocity data, distance data, and direction data, and may output a control signal including number information. The control signal output from the dice may include rotation motion according to the movement of the dice and/or number information (or number change information) of the dice determined according to the rotation motion. A change in the number of the dice may be represented on a three-dimensional space by the host device.

The dice may include a hollow for embedding the electronic device 3000. The dice may embed the electronic device 3000 by further including a hollow for embedding the sensing module, the control signal output unit, and the battery.

The dice may further include a charging terminal for charging the battery. For example, a charging terminal for receiving a charging current may be positioned on a surface of the dice. Accordingly, the electronic device 3000 may be charged only by connecting a charging cable to the dice without having to take the electronic device 3000 out of the dice to charge the electronic device 3000 embedded in the dice.

Figure 9:
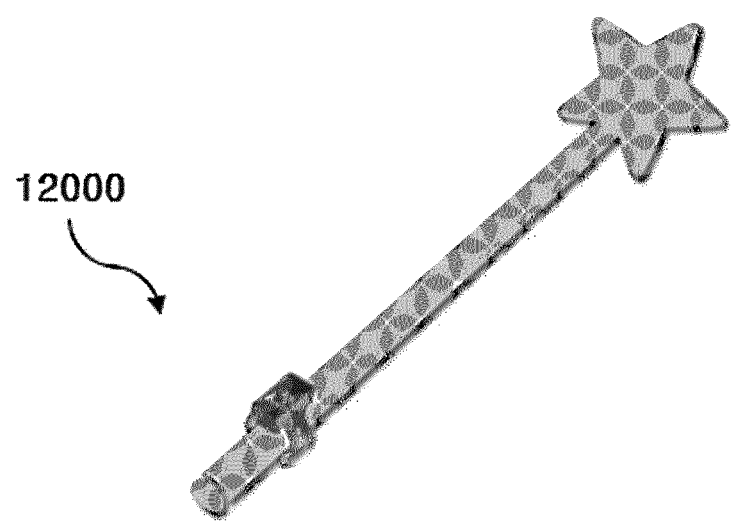
FIG. 9 shows a wand to which an electronic device is connected, according to an embodiment.

FIG. 9 shows a wand to which an electronic device is connected, according to an embodiment.

The wand is connected with the electronic device 3000 described above with reference to FIG. 3, and a user may use the wand to enjoy various games utilizing a wand, such as fencing games and sword fighting games. According to another embodiment, the electronic device 3000 described above with reference to FIG. 3 may be embedded in the wand.

Alternatively, the electronic device 3000 may also be embedded in a content controller such as a joystick.

Hereinafter, with reference to FIGS. 10 to 18, a method of controlling content using an electronic device will be described. The method described with reference to FIGS. 10 to 18 may be performed in at least one of the electronic device 3000 and the host device of FIG. 3. Therefore, although omitted below, the content described with reference to the electronic device 3000 or the host device of FIG. 3 may also be applied to FIGS. 10 to 18. In addition, the content about the method of FIGS. 10 to 18 may also be applied to the electronic device 3000 or the host device of FIG. 3.

Figure 10:
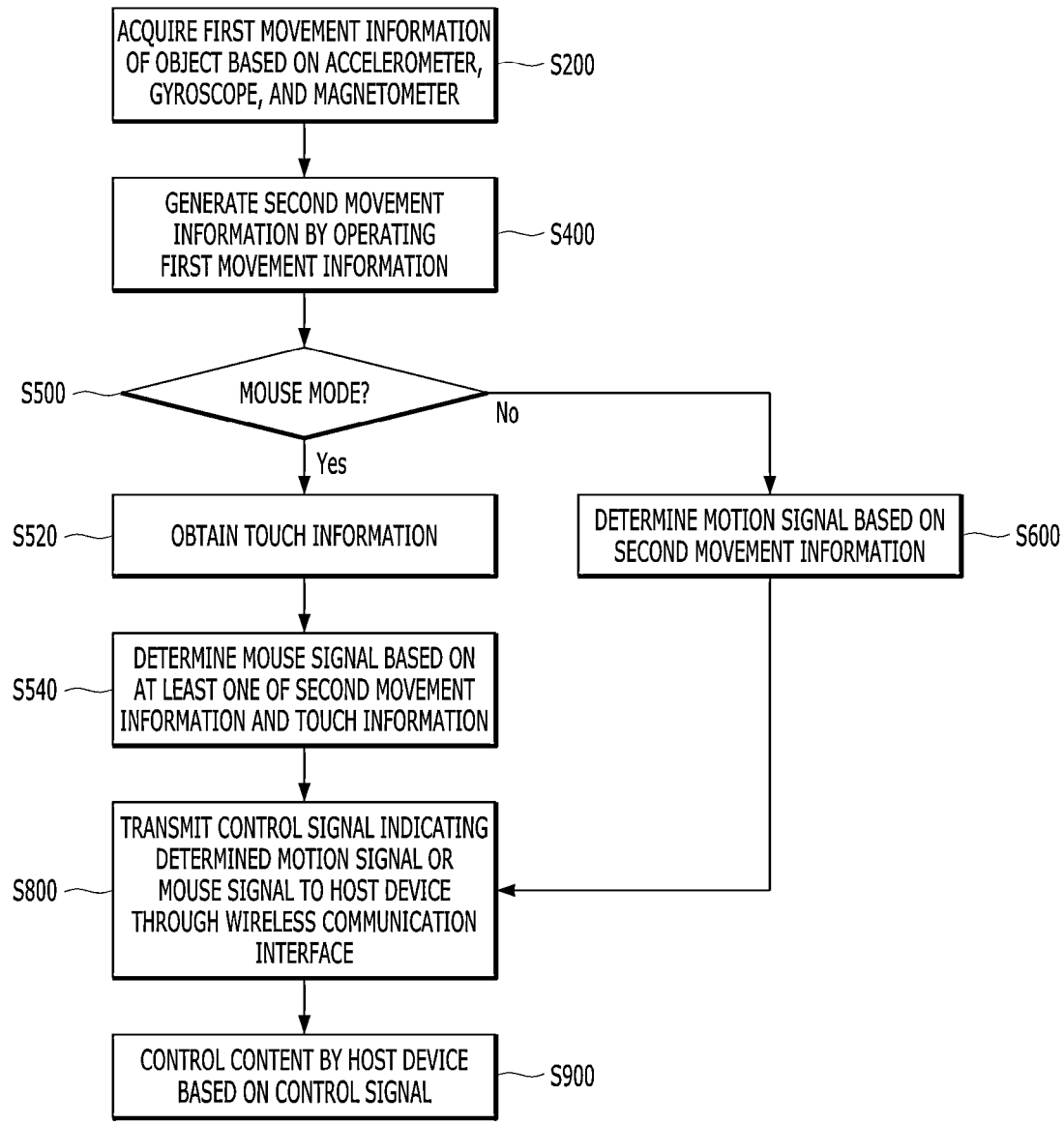
FIG. 10 shows a flowchart of a method for controlling content using an electronic device, according to an embodiment.

FIG. 10 shows a flowchart of a method for controlling content using an electronic device, according to an embodiment.

In Step S200, the electronic device may acquire first movement information of an object based on a sensing module. The object may mean the electronic device itself. The sensing module may include an accelerometer, a gyroscope, and a magnetometer. The first movement information may include acceleration data and angular velocity data about the movement of the object. For example, the first movement information may be data obtained by optimizing acceleration data obtained through the accelerometer and the angular velocity data obtained through the gyroscope by a sensor fusion unit.

In Step S400, the electronic device may generate second movement information by operating the first movement information obtained in Step S200. The second movement information may include at least one among angle data, velocity data, distance data, and direction data. The electronic device may calculate and obtain the second movement information in real time while the object is moving. For example, the electronic device may acquire the second movement information by performing operation on the first movement information every reference time (e.g., 5 ms). The reference time may be 30 ms or less, but is not limited thereto. The electronic device is worn on the middle knuckle of an index finger, so that an angle and velocity at which the middle knuckle of the index finger has moved may be determined by using a joint between the first knuckle and the middle knuckle of the index finger as an axis. In addition, the electronic device is worn on the last knuckle of an index finger so that an angle and velocity at which the last knuckle of the index finger has moved may be determined by using a joint between the first knuckle and the middle knuckle of the index finger as an axis.

In Step S500, the electronic device may determine whether a current mode is a mouse mode or a gesture mode. If the current mode is the mouse mode (Yes), the electronic device may obtain touch information in Step S520, and may determine a mouse signal based on at least one of the second movement information and the touch information in Step S540.

If the current mode is the gesture mode (No), in Step S600, the electronic device may determine a motion signal corresponding to the movement of the object based on the obtained second movement information. According to an embodiment, the electronic device may determine a motion signal corresponding to the movement of the object. According to an embodiment, the electronic device may determine a motion based on the velocity, angle, distance, and the like at which an index finger has moved. Motions may include, but are not limited to, move (including x, y, and z axes directions), tap, grasp, scroll, swipe, gesture, rotation motions, and the like. The motions may include a user-defined motion defined by a user. If the movement of an object does not correspond to any of motions predefined by a manufacturer or user-defined motions added by a user or is determined to be a meaningless movement, the electronic device may not generate a motion signal and process the case as an exception.

In Step S800, the electronic device may transmit a control signal indicating the determined motion signal or mouse signal to a host device through a wireless communication interface. The control signal may be an interrupt signal for controlling the host device. According to an embodiment, the electronic device may determine whether the position of an object is within a reference distance from a position at which content is reproduced, and may transmit the control signal to the host device only when it is determined that the position of the object is within the reference distance. This is because, when a user is far away from the content, it is difficult to determine whether the user's is a movement for controlling the content.

In Step S900, the host device may control the content based on the received control signal. For example, when the received control signal is a move motion, the host device may move a baseball in a game in a direction, velocity, and distance proportional to the movement of the object. When the received control signal is a tap motion, the host device may select an item in the game. When the received control signal is a rotation motion, the host device may rotate a disc in the game. When the received control signal is a move motion, the host device may zoom-in or zoom-out the content according to the distance between the object and the content. When the received control signal is a left move motion, the host device may turn pages forward of a word document or a presentation document running. When the received control signal is a right move motion, the host device may turn pages backward of a word document or a presentation document running. When the received control signal is a mouse move, the host device may move a mouse pointer. When the received control signal is a mouse click, the host device may perform a click action at a current mouse position. When the received control signal is mouse scroll up, the host device may perform an action corresponding to a mouse scroll up.

Figure 11:
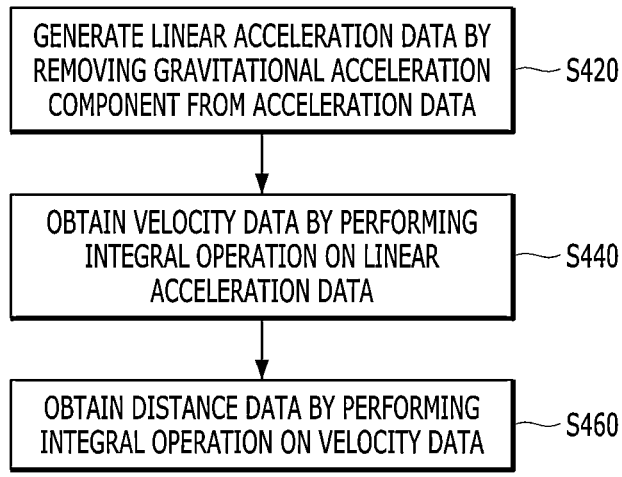
FIG. 11 shows a flowchart of a method for obtaining distance data, according to an embodiment.

FIG. 11 shows a flowchart of a method for an electronic device to obtain distance data for the movement of an object, according to an embodiment.

In Step S420, the electronic device may generate linear acceleration data by removing a gravitational acceleration component from acceleration data. By removing the influence by gravitational acceleration from the acceleration data, acceleration data for the movement of the object may be obtained.

In Step S440, the electronic device may obtain velocity data by performing an integral operation on the linear acceleration data.

In Step S460, the electronic device may obtain the distance data by performing an integral operation on the velocity data.

Figure 12:
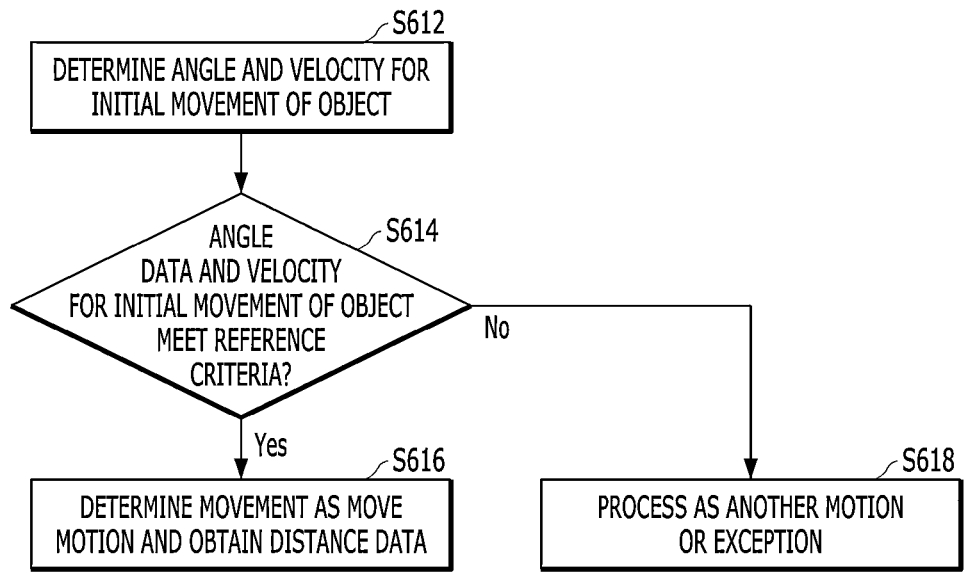
FIG. 12 shows a flowchart of a method for an electronic device to determine the movement of an object as a mouse move under a mouse mode or a move motion under a gesture mode, and obtain movement distance data, according to an embodiment.

FIG. 12 shows a flowchart of a method for determining the movement of an object as a mouse move under a mouse mode or a move motion under a gesture mode, and obtaining movement distance data, according to an embodiment. FIG. 12 may show a sub-step of Step S540 or S600 of FIG. 10.

In Step S612, the electronic device may determine an angle and velocity for the initial movement of an object. The electronic device may obtain angle data and velocity data for the initial movement after the movement of the object begins (e.g., within a reference time after movement begins).

In Step S614, the electronic device may determine whether the angle data and the velocity data obtained in Step S612 meet reference criteria. For example, when the velocity is equal to or greater than a reference value and the angle change range is within 20 degrees, the electronic device may determine the movement of the object as the movement in a straight direction. If the angle data and the velocity data do not meet the reference criteria (No), the electronic device may determine whether the movement of the object corresponds to another motion, and when it is determined that the movement of the object does not correspond to any motion, the electronic device may process the case as an exception S618.

If the angle data and the velocity data meet the reference criteria (Yes), the electronic device may determine the movement as a move motion or a mouse move, and may obtain distance data for the movement of the object S616. For example, the electronic device may determine, as a start point for the movement, a point in time at which the electronic device moves at a preset velocity or higher in a direction to be moved. The distance data for the movement of the object may be determined by the method described above with reference to FIG. 11.

According to an embodiment, the electronic device may further obtain position data (e.g., three-dimensional spatial coordinates of an object) and direction data in addition to the distance data.

When the position of an object at an arbitrary point in time or the position thereof in an arbitrary space is set as a reference point, the electronic device may obtain current position data of the object based on the movement distance data of the object. The electronic device may determine a movement distance for each movement unit of the object, and store determined distance data in a memory. The electronic device may read distance data for movements from the memory, and may determine the current position data of the object by summing the read distance data.

For example, when position data of an object at an arbitrary previous point in time is (0, 0, 0) and a move motion occurs three times consecutively, and when first distance data of a first move motion is (10, −20, 30), second distance data of a second move motion is (−10, −30, −10), and third distance data of a third move motion is (20, 100, 100), the electronic device may determine current position data of the object as (20, 50, 120). For example, when the first move motion occurs once, and an object is simply moved because a person moves his or her position and another move motion occurs again, and when the first distance data of the first move motion is (5, 30, 20), the second distance data for the simple movement is (500, 500, 0), and the second distance data of the second move motion is (10, 30, 30), and the current position data of the object may be determined as (515, 560, 50).

The electronic device may obtain direction data in which the object is moving based on a comparison between current distance data and previous distance data. The previous distance data may mean distance data obtained immediately before. For example, when distance data is calculated every 5 ms, based on distance data at a point in time t and distance data obtained at a point in time t−5 ms, it is possible to determine whether there is an increase or decrease in the x-axis direction, whether there is an increase or decrease in the y-axis direction, and whether there is an increase or decrease in the z-axis. For example, if the current distance data has an x-axis direction value of +50, an y-axis direction value of +10, and an z-axis direction value of −5, and the previous distance data has an x-axis direction value of +60, an y-axis direction value of +15, and an z-axis direction value of −10, the electronic device 3000 may determine that a current movement direction is increased in the x-axis direction, increased in the y-axis direction, and decreased in the z-axis direction.

Figure 13:
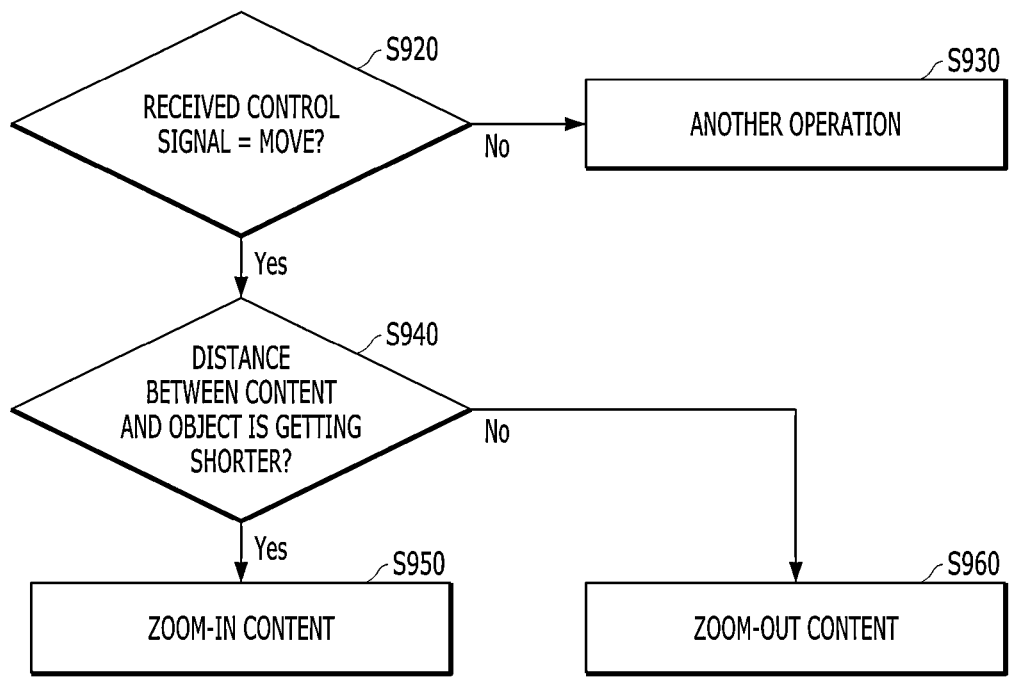
FIG. 13 shows a flowchart of an operation in which a host device zooms in or zooms out content, based on a move motion, according to an embodiment.

FIG. 13 shows a flowchart of an operation in which a host device zooms in or zooms out content, based on a move motion, according to an embodiment. The flowchart of FIG. 14 may show a sub-step of Step S900 of FIG. 10.

In Step S920, the host device may determine whether the control signal received from the electronic device is a move motion. The move motion may be a move motion in the forward direction or the back direction described above with reference to FIG. 7. If a received control signal is not a move signal (No), the host device may perform another operation corresponding to the received control signal S930.

If the received control signal is a move signal (Yes), in Step S940, it is possible to determine whether the distance between the content and an object is getting shorter. If the content is being reproduced on a display of a host device, the position of the content may be the same as the position of the host device itself, and if the content is virtual reality content reproduced by the host device, the position of the content may not be the same as the position of the host device.

Figure 14:
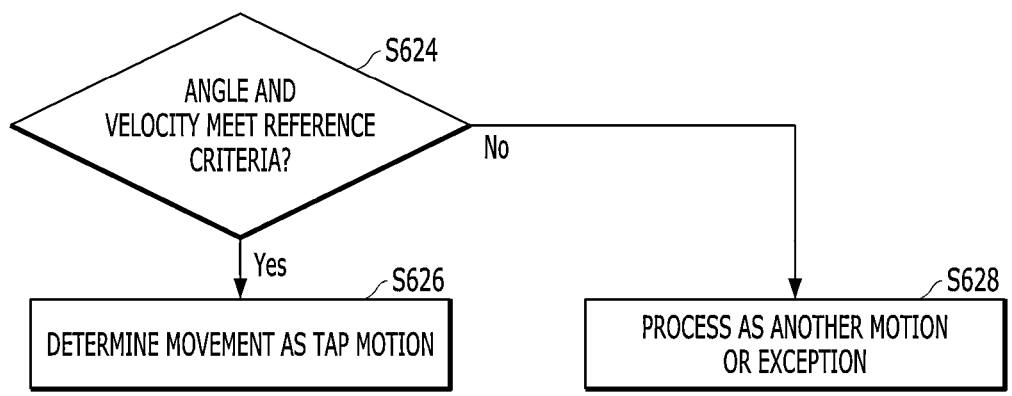
FIG. 14 shows a flowchart of a method for an electronic device to determine the movement of an object as a tap motion, according to an embodiment.

If it is determined that the distance between the position of the object and the position of the content, which is determined from the movement distance of the object, is getting shorter (Yes), the host device may zoom-in the content S950. If it is determined that the distance between the position of the object and the position of the content is getting longer (No), the host device may zoom-out the content S960. However, the flowchart of FIG. 14 is only an embodiment for the host device to perform zoom-in/zoom-out operations based on a move motion, and the zoom-in/zoom-out operations may be defined by a different move motion. For example, zoom-out may be performed when the distance between the content and the object is short, and zoom-in may be performed as the distance increases. Alternatively, if the object moves to the right (or left), zoom-in may be performed, and if the object moves to the left (or right), zoom-out may be performed. Alternatively, the electronic device may determine the distance between the content and the object, and depending on a determination result, may output a control signal to the host device as a zoom-in/zoom-out signal instead of a move signal. In this case, the determination of the distance between the content and the object and the operation of transmitting the zoom-in/zoom-out signal may be performed in Step S600 and Step S800 of FIG. 10, respectively.

Hereinafter, FIGS. 14 to 18 show flowcharts of a method for an electronic device to determine a specific motion signal for controlling a host device from movement information of an object under a gesture mode, according to an embodiment.

FIG. 14 shows a flowchart of a method for an electronic device to determine the movement of an object as a tap (or a click) motion, according to an embodiment. The flowchart of FIG. 14 may show a sub-step of Step S600 of FIG. 10.

In Step S624, the electronic device may determine whether the angle data and the velocity data for a movement meet reference criteria. The electronic device may determine whether an angle is within a first reference range and velocity is within a second reference range.

If it is determined that the angle and the velocity meet the reference criteria (Yes), in Step S626, the electronic device may determine the movement of an object as the tap motion. Otherwise (No), in Step S628, the electronic device may determine whether the movement of the object corresponds to another motion, and when it is determined that the movement of the object does not correspond to any motion, the electronic device may process the case as an exception.

Figure 15:
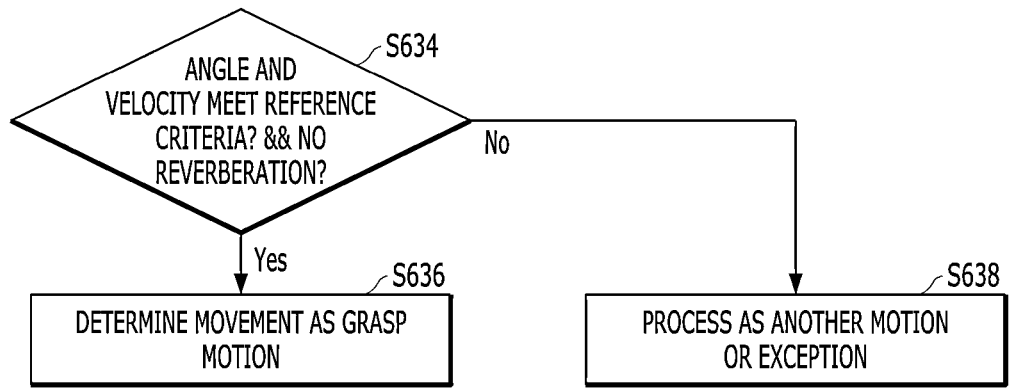
FIG. 15 shows a flowchart of a method for an electronic device to determine the movement of an object as a grasp motion, according to an embodiment.

FIG. 15 shows a flowchart of a method for an electronic device to determine the movement of an object as a grasp motion, according to an embodiment. The flowchart of FIG. 16 may show a sub-step of Step S600 of FIG. 10.

In Step S634, the electronic device may determine whether the angle and the velocity meet the reference criteria and whether there is any reverberation for a movement. For example, the electronic device may determine whether the angle is within the first reference range and the velocity is within the second reference range. In addition, the electronic device may determine there is any reverberation for the movement of an object. The reverberation refers to a movement (or shaking) of an object (e.g., a finger), which is generated regardless of a user's intention and which is generated according to characteristics or movement inertia of the object even when the user has finished his or her movement. For example, the reverberation may mean a remaining signal due to inertia of an accelerometer. In the case of the grasp motion, unlike the tap motion, when an object (e.g., an index finger) contacts or is coupled with another object (e.g., a thumb), a movement is terminated and reverberation is not generated, so that the presence or absence of reverberation may be a criterion for distinguishing the tap motion from the grasp motion.

If it is determined that the angle and the velocity meet the reference criteria and there is no reverberation (Yes), in Step S636, the electronic device may determine the movement of an object as the grasp motion. Otherwise (No), in Step S638, the electronic device may determine whether the movement of the object corresponds to another motion, and when it is determined that the movement of the object does not correspond to any motion, the electronic device may process the case as an exception.

Figure 16:
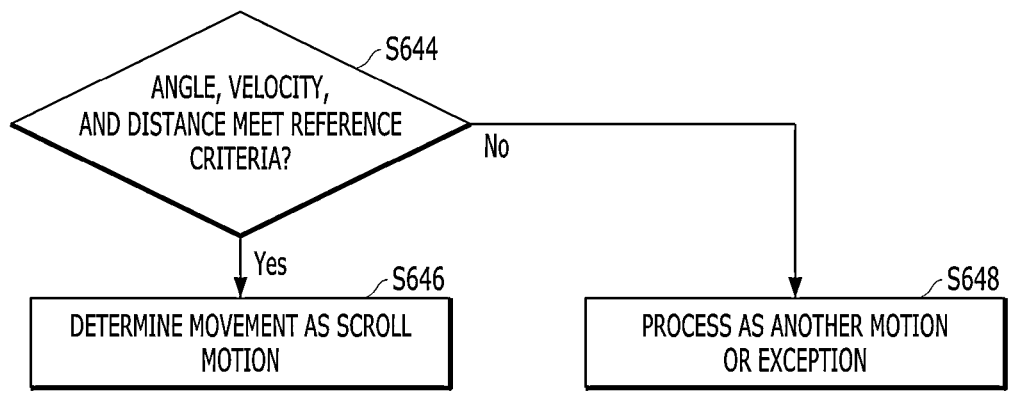
FIG. 16 shows a flowchart of a method for an electronic device to determine the movement of an object as a scroll motion, according to an embodiment.

FIG. 16 shows a flowchart of a method for an electronic device to determine the movement of an object as a scroll motion, according to an embodiment. The flowchart of FIG. 16 may show a sub-step of Step S600 of FIG. 10.

In Step S644, the electronic device may determine whether the angle, velocity, and distance meet reference criteria. For example, the electronic device may determine whether the angle is within the first reference range, the velocity is within the second reference range, and the distance is within a third reference range. The electronic device may determine whether the angular velocity for any one of the x, y, and z axes is equal to or greater than a reference value, and whether an angle for at least one direction among x, y, and z axes directions is within a reference range. In addition, the electronic device may determine whether the distance (e.g., the movement distance of the middle knuckle or the last knuckle of an index finger) is greater than a threshold value. Considering that the scroll motion has a bigger movement of a finger compared to the tap motion, the distance may be a criterion for distinguishing the tap motion from the scroll motion.

If it is determined that the angle, velocity, and distance meet the reference criteria (Yes), in Step S646, the electronic device may determine the movement of an object as the scroll motion. Otherwise (No), in Step S648, the electronic device may determine whether the movement of the object corresponds to another motion, and when it is determined that the movement of the object does not correspond to any motion, the electronic device may process the case as an exception.

Figure 17:
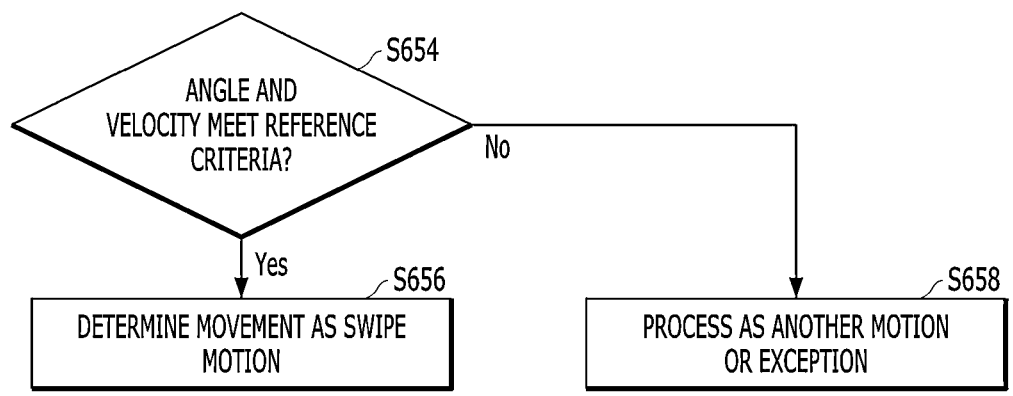
FIG. 17 shows a flowchart of a method for an electronic device to determine the movement of an object as a swipe motion, according to an embodiment.

FIG. 17 shows a flowchart of a method for an, electronic device to determine the movement of an object as a swipe motion, according to an embodiment. The flowchart of FIG. 17 may show a sub-step of Step S600 of FIG. 10.

In Step S654, the electronic device may determine whether the velocity and distance meet reference criteria. For example, the electronic device may determine whether the velocity is within the first reference range and the distance is within the second reference range. Considering that the swipe motion has a bigger movement compared to the move motion, whether both the velocity and the distance are greater than a threshold value may be a criterion for distinguishing the swipe motion from the move motion.

If it is determined that the velocity and the distance meet the reference criteria (Yes), in Step S656, the electronic device may determine the movement of an object as the swipe motion. Otherwise (No), in Step S658, the electronic device may determine whether the movement of the object corresponds to another motion, and when it is determined that the movement of the object does not correspond to any motion, the electronic device may process the case as an exception.

Figure 18:
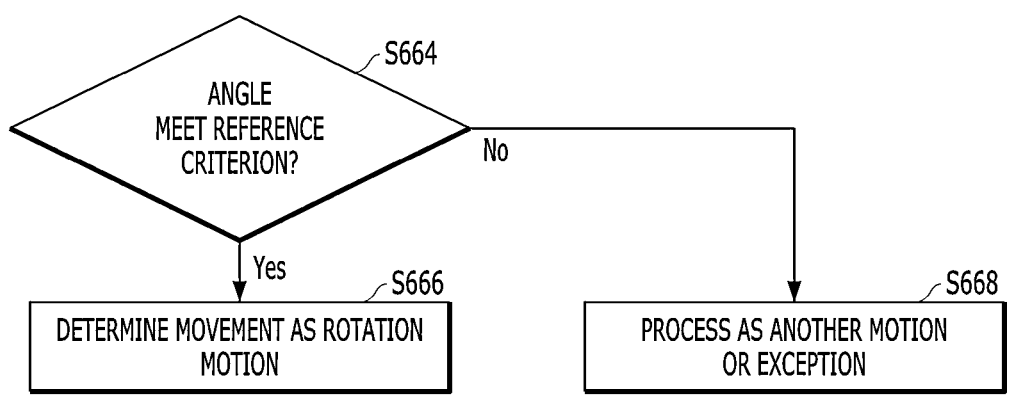
FIG. 18 shows a flowchart of a method for an electronic device to determine the movement of an object as a rotation motion, according to an embodiment.

FIG. 18 shows a flowchart of a method for an electronic device to determine the movement of an object as a rotation motion, according to an embodiment. The flowchart of FIG. 19 may show a sub-step of Step S600 of FIG. 10.

In Step S664, the electronic device may determine whether an angle meet a reference criterion. For example, if movement angles for each of the x-axis, y-axis, and z-axis directions all meet reference criteria (Yes), in step S666, the electronic device may determine the movement of an object as the rotation motion. Otherwise (No), in Step S668, the electronic device may determine whether the movement of the object corresponds to another motion, and when it is determined that the movement of the object does not correspond to any motion, the electronic device may process the case as an exception.

Meanwhile, the above-described method for controlling may be implemented as a computer-readable code on a computer-readable recording medium. The computer-readable recording medium includes all types of recording devices in which data readable by a computer system is stored. Examples of the computer-readable recording medium include ROMs, RAMs, CD-ROMs, magnetic tapes, floppy disks, optical data storage devices, and the like. In addition, the computer-readable recording medium is distributed in a computer system connected through a network, so that a processor-readable code may be stored and executed in a distributed manner.

The above descriptions are intended to provide exemplary configurations and operations for implementing the present invention. The technical spirit of the present invention will include not only the embodiments described above, but also implementations that can be obtained by simply changing or modifying the above embodiments. In addition, the technical spirit of the present invention will also include implementations that can be achieved by easily changing or modifying the embodiments described above in the future.

The invention claimed is:
1. An electronic device which is paired with a host device to control content of the host device, comprises:
   a touch sensing module including a surface divided into a first touch region, a second touch region, and a third touch region;
   a movement sensing module for acquiring first movement information in a three-dimensional space of the electronic device based on an accelerometer, a gyroscope, and a magnetometer;
   a control signal output unit for acquiring second movement information through operation of the first movement information, and determining, under a gesture mode, a motion corresponding to the movement of the electronic device based on the second movement information and outputting a motion signal indicating the determined motion to the host device, and determining, under a mouse mode, a mouse action based on at least one of touch information acquired from the touch sensing module and the second movement information and outputting a mouse signal indicating the mouse action to the host device;
   a case for embedding the touch sensing module, the movement sensing module, and the control signal output unit; and
   a cradle device for receiving the case and closing a lid or opening the lid so as to take out the case,
   wherein:
      the first movement information includes at least one of acceleration data obtained through the accelerometer and angular velocity data obtained through the gyroscope;
      the movement sensing module transmits the first movement information to the control signal output unit through an internal bus;
      the second movement information includes at least one of angle data, distance data, velocity data, and direction data;
      the mouse signal includes a mouse click, a mouse scroll, a mouse move, or a mouse drag;
      switching between the mouse mode and the gesture mode is performed by a touch action sensed by the touch sensing module;
      a center of gravity pendulum is positioned at the bottom of the cradle device;
      when the case is accommodated in the cradle device and the lid is closed, the first touch region, the second touch region, and the third touch region for the touch action are exposed, when a user moves while holding the cradle device in his or her hand, or touches the exposed first touch region, the second touch region, or the third touch region, the motion signal or the mouse signal is output;
      when the user moves the case while wearing the case separated from the cradle device on a finger or touches the first touch region, the second touch region, or the third touch region, the motion signal or the mouse signal is output;
      the control signal output unit determines, under the mouse mode, the mouse move from the second movement information, wherein:
         if a touch action sensed by the touch sensing module is a touch only to the first touch region or a simultaneous touch to the first touch region and the second touch region, the mouse action is determined as the mouse click; and
         if a touch action sensed by the touch sensing module is a sequential touch to the first touch region, the second touch region, and the third touch region, the mouse action is determined as the mouse scroll.

2. The electronic device of claim 1, wherein:
the distance data comprises distance data for each of an x-axis direction, a y-axis direction, and a z-axis direction;
the velocity data comprises velocity data for each of the x-axis direction, the y-axis direction, and the z-axis direction;
the direction data comprises information on whether there is an increase or decrease in the x-axis direction, whether there is an increase or decrease in the y-axis direction, and whether there is an increase or decrease in the z-axis direction; and
the control signal output unit determines the mouse action as the mouse drag when the case is moved while the touch sensing module is being touched longer than a reference time.

3. The electronic device of claim 1, wherein:
the control signal output unit is configured to determine, under the gesture mode, a motion corresponding to the second movement information among predefined motions for controlling the host device,
wherein:
the predefined motions include a move for turning a page of a document executed in the host device; and
the predefined motions further include a user-defined motion, wherein the user-defined motion is defined by allowing a user holding the electronic device in his or her hand or wearing the electronic device to repeatedly take a specific movement and allowing the user to match the specific movement with the user-defined motion.

4. The electronic device of claim 3, wherein the control signal output unit determines, if the user of the electronic device is a first user, a corresponding motion by inputting the second movement information of the first user into a first decision model, and determines, if the user of the electronic device is a second user, a corresponding motion by inputting the second movement information of the second user into a second decision model,
wherein:
the first decision model is generated based on a machine learning technique in which the second movement information of the first user and a specific motion are repeatedly applied as an input and an output, respectively; and
the second decision model is generated based on a machine learning technique in which the second movement information of the second user and a specific motion are repeatedly applied as an input and an output, respectively.

5. The electronic device of claim 1, wherein the motion sensing module further comprises a sensor fusion unit for acquiring the first motion information optimized by compensating and fusing data obtained from each of the accelerometer, the gyroscope, and the magnetometer based on a filter.

6. The electronic device of claim 1, wherein the control signal output unit comprises:
a processor for acquiring the second movement information by operating the first movement information, and for determining the motion or mouse action corresponding to the movement of the electronic device based on the second movement information; and
a communication unit for transmitting the motion signal or the mouse signal to the host device based on a wireless communication interface.

7. The electronic device of claim 6, wherein the processor acquires the second movement information every reference time, wherein the reference time is 30 ms or less.

8. The electronic device of claim 6, wherein the processor obtains the velocity data and the distance data by performing an integral operation on linear acceleration data obtained by removing a gravitational acceleration component from the acceleration data.

9. The electronic device of claim 6, wherein the processor obtains the angle data by performing an integral operation on the angular velocity data, and obtains the direction data based on a comparison between current distance data and previous distance data.

* * * * *